April 19, 1955

E. J. SPERBER

RECORD CHANGING CONTROL SYSTEM
FOR AUTOMATIC RECORD CHANGERS 2,706,639

Filed Aug. 31, 1951

4 Sheets-Sheet 1

INVENTOR
Edward J. Sperber
BY H. W. Newton
ATTORNEY

April 19, 1955 E. J. SPERBER 2,706,639

RECORD CHANGING CONTROL SYSTEM FOR AUTOMATIC RECORD CHANGERS

Filed Aug. 31, 1951 4 Sheets-Sheet 2

INVENTOR
Edward J. Sperber
BY H. C. Newton
ATTORNEY

April 19, 1955 E. J. SPERBER 2,706,639

RECORD CHANGING CONTROL SYSTEM FOR AUTOMATIC RECORD CHANGERS

Filed Aug. 31, 1951 4 Sheets-Sheet 3

INVENTOR
Edward J. Sperber
BY H. C. Newton
ATTORNEY

INVENTOR
Edward J. Sperber
BY H. W. Newton
ATTORNEY

United States Patent Office 2,706,639

Patented Apr. 19, 1955

2,706,639

RECORD CHANGING CONTROL SYSTEM FOR AUTOMATIC RECORD CHANGERS

Edward J. Sperber, Philadelphia, Pa., assignor to Radio Corporation of America, a corporation of Delaware Application August 31, 1951, Serial No. 244,638

7 Claims. (Cl. 274—10)

This invention relates to drop type automatic record changers for phonographs and the like, and more particularly to a system for controlling the operation of spindle-housed record changing apparatus of drop-type record changers.

More specifically, this invention relates to an automatic record changer of the drop type as disclosed for example, in a copending application of Benjamin R. Carson, Serial No. 84,502, for Automatic Phonograph Record Playing Mechanism, and assigned to the same assignee as the present application. The record changer referred to utilizes an enlarged turntable center post, on which a stack of records may be placed for sequential playing, with the lowermost record of the stack supported adjacent its center upon a pair of retractable record supporting shoulders or shelves on opposite sides of the center post.

Periodically, at the completion of the playing of each record, a record changing cycle is automatically initiated, and a succeeding record is dropped onto the turntable to be played. The record changing apparatus housed in the center post includes the retractable shelves, a pair of cooperating record separators or record separating blades, which are withdrawn inside the center post during a record playing cycle, and a central control shaft. The shaft, separators and shelves rotate with the turntable and spindle and effectuate selection of the lowermost record of a stack by braking, or stopping rotation of the central shaft in the turntable. One end of the central shaft projects between the shelves and separators. Upon the completion of a record playing cycle, and during the change cycle, the record changing control system operates to stop and hold the control shaft stationary with respect to the rotating turntable and spindle. In the record changer referred to, furthermore, the record changing control system comprises a lever operable to engage a tooth of a star-shaped wheel fixed to the inner or lower end of the central control shaft to stop said shaft, whereupon the turntable and spindle continue to rotate and the blades are moved outwardly between the lowermost and next lowermost records of the stack, and simultaneously the shelves are withdrawn inside the center post to permit the lowermost record to drop onto the turntable or onto the stack thereon. After the record has dropped, the stationary shaft upon further rotation of the turntable, cams the shelves outwardly and the blades inwardly so that the shelves support the remaining records of the stack. Thereafter the control shaft is released by the record changing control system for continuing rotation with the turntable for the playing of the record placed thereon.

A motor for driving the turntable effects rotation of such turntable through a gear train comprising one or more rubber tired wheels or the like, with a driven rubber tire bearing against inner peripheral edge of the turntable flange. Should the record changing apparatus fail to function properly upon immobilizing or stopping the central shaft, as for instance by the record separating blades jamming against the inner peripheral edge of a record and failing to move outwardly in the intended manner, the stationary shaft acts through the blocked blades to stop the turntable. This results in a heavy load being placed on the motor and the turntable driving tire. Simultaneously the turntable may react upon the stationary shaft through the blades to effect rotation thereof with consequent damaging effect upon the record changing apparatus, the shaft, and the record changing control system.

Accordingly it is a primary object of this invention to provide a record changing control system of the type referred to which operates to prevent motor overload and damage to the turntable drive system when the record changer malfunctions by jamming.

It is also an object of this invention to provide an improved record changing control system or mechanism for drop type automatic record changers which promptly and accurately stops a rotating control shaft to effect operation of record changing apparatus cooperatively connected therewith.

It is another object of this invention to provide a record changing control system or mechanism for automatic record changers for stopping a control shaft relative to rotating record changing apparatus cooperatively connected therewith, and which is operable to prevent damage to component parts of the record changer upon failure of the record changing apparatus to function properly.

It is still another object of this invention to provide an improved record changing control system or mechanism for automatic drop type record changers which is of compact design and employs a minimum number of movable parts.

Yet another object of this invention is to provide a record changing control system or mechanism for automatic record changers of the drop type which consists of relatively simple and inexpensive component parts of rugged construction and capable of dependable operation over extended usage to feed records to a turntable from a central spindle.

In accordance with one form of this invention, a record change cycle control slide adapted to be moved transversely to the axis of a normally rotating control shaft associated with record changing apparatus is provided with a spring biased stop member or blade. The shaft is connected with a peripherally serrated clutch disk or finely toothed ratchet wheel located in the path of the stop member and which is engaged thereby to stop the rotation of the shaft and effect the operation of the record changing apparatus. Thrust spring means and clutch elements mounted on the shaft permit such shaft to be stopped when the ratchet wheel or disk is engaged by the stop member, yet also permits such toothed ratchet wheel or disk to slip on the shaft in the event that the record changing apparatus fails to function properly as by jamming.

The record separators or record separating blades and the shelves or shoulders are operated bv a flattened cam portion of the outer or upper end of the control shaft when the latter is stopped. This is by reason of the fact that the separators and shelves rotate with the turntable and spindle and are connected in pairs, one separator with one shelf on opposite sides of the spindle under control of biasing compression springs acting in the shelves to retract the separators and extend the shelves. The separators are acted upon by the fixed shaft end to move outwardly and thus retract the shelves as the spindle, separators and shelves revolve with the turntable, and then return the shelves and separators to respective projected and retracted positions during each change cycle.

It is the blocking of the separators or shelves among other things, that may cause damage to the turntable drive, and hence the system in accordance with the invention, is arranged to limit the driving torque that may be applied by the motor to overcome the locking action on the control shaft and permit it to be carried along with the blocked shelves or separators in the further free rotation of the turntable and spindle.

The invention will further be understood from the following description with reference to the accompanying drawings, and its scope is pointed out in the appended claims. In the drawings, Figure 1 is a side view of an automatic record changer provided with a record changing control system embodying the invention;

Figure 1:
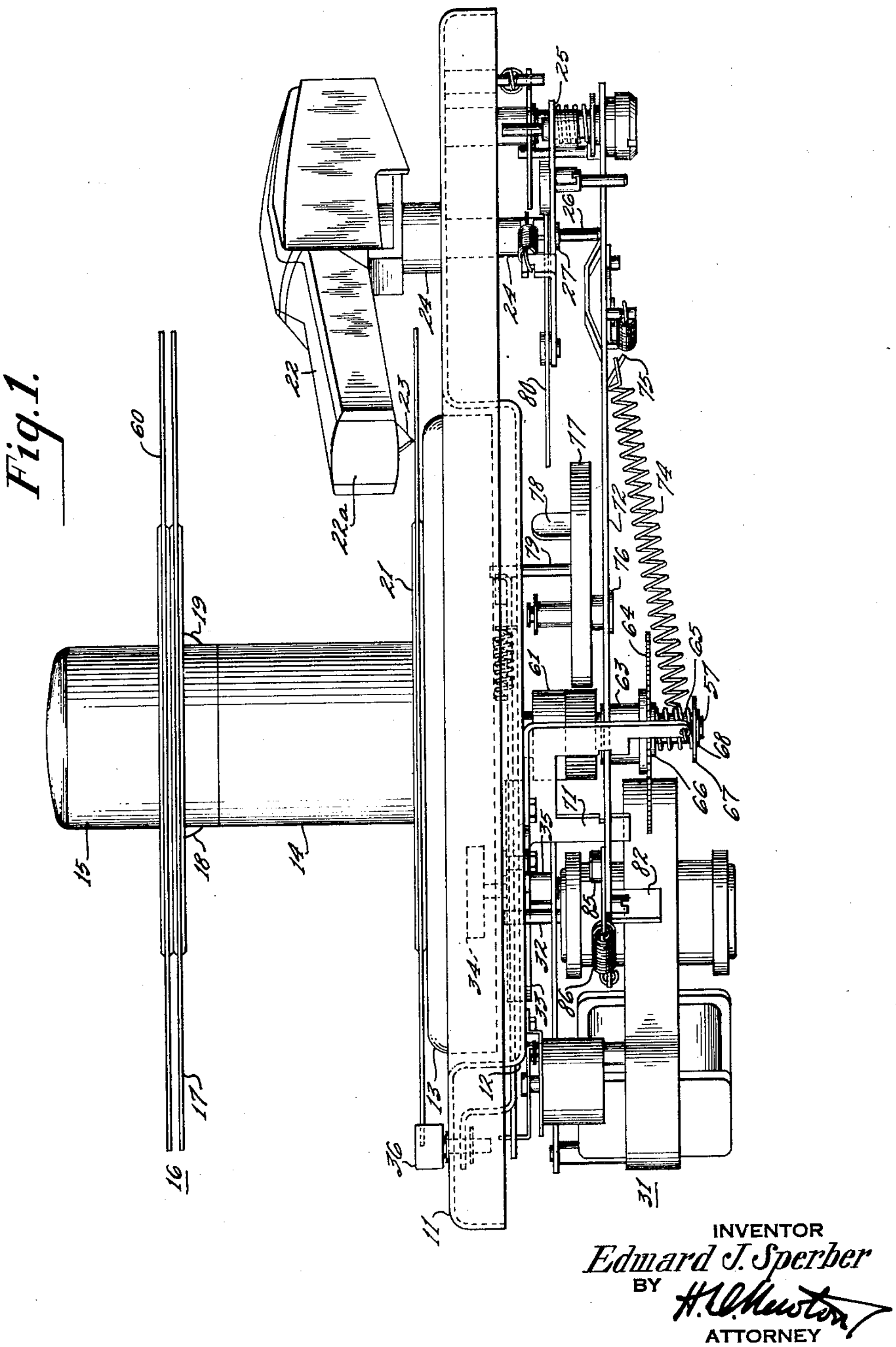
Figure 2:
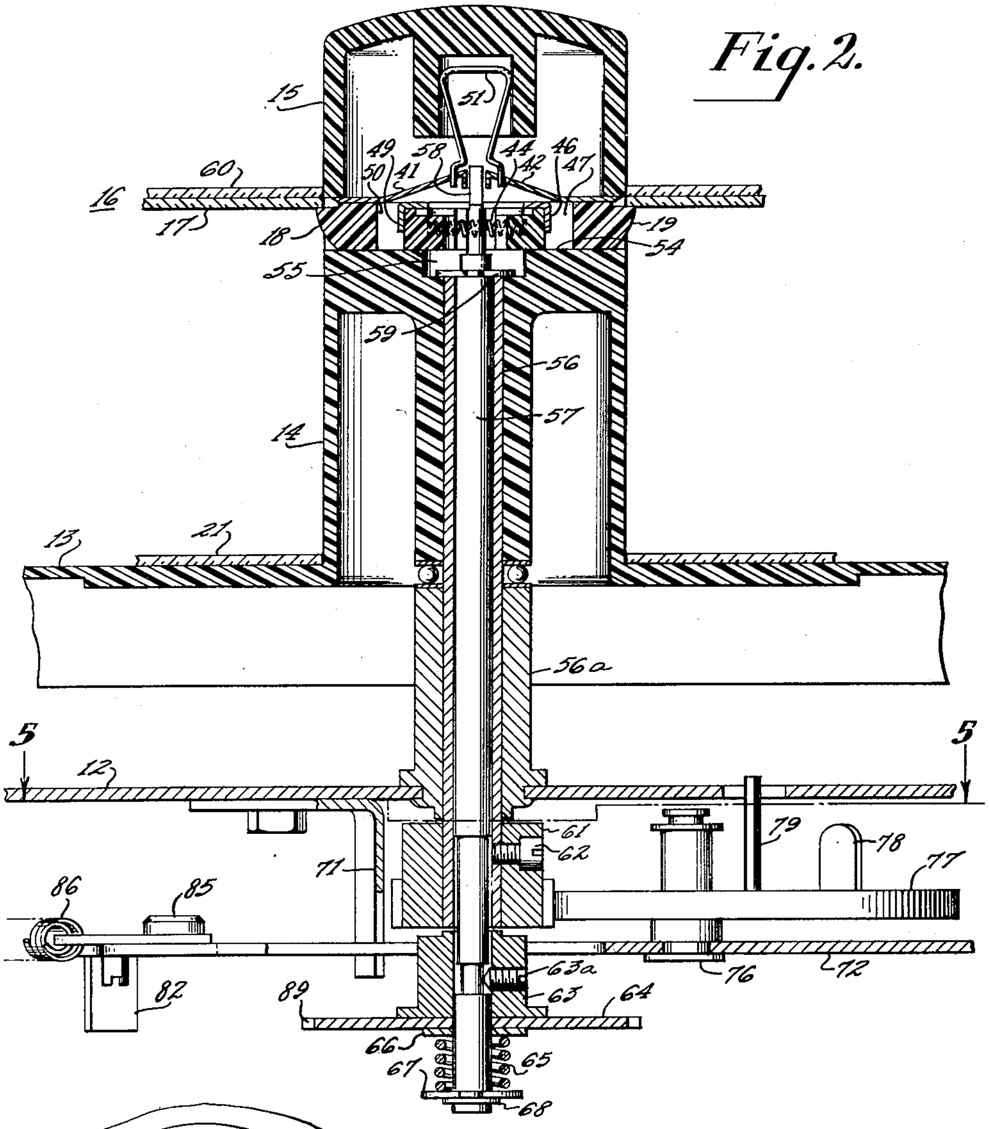
Figure 2 is a side view, partly in section, of the automatic record changer of Figure 1, showing further details of the construction of the record changing control system in accordance with the invention.

Referring to the drawings, in which like reference characters indicate like parts throughout, and referring more particularly to Figures 1 and 2, the record changer is provided with a motor board 11 having a turntable well 12 in which a turntable 13 is rotatably mounted. The turntable 13 carries a record receiving spindle or center post 14 of relatively large diameter, to the top of which is fixed a cap 15 of the same diameter adapted to receive a stack of records 16. The lowermost record 17 of the stack rests on a pair of oppositely disposed record supporting shoulders or shelves 18, 19 which project from the body of the center post 14 at the top thereof. A record 21 is shown carried on the turntable.

A tone arm 22 carries a sound-reproducing or phonograph pick-up device (not shown) within the free end **22*a* thereof. The pick-up device is provided with a suitable stylus 23 for engaging the sound grooves of the record 21. The opposite end of the tone arm is mounted on a tone arm post 24, through which a suitable bushing 27 (see Figure 1) extends below the motor board 11 to couple mechanically a trip lever assembly plate 25 to the tone arm, thus providing for horizontal rotation of the tone arm with the trip lever assembly plate 25 about the tone arm post 24. The tone arm is provided with a vertical elevating rod 26 located within the bushing 27 and extending below the trip lever assembly plate 25, representing any suitable arrangement for raising and lowering the tone arm. An electric motor 31 of well known construction drives a motor spindle 32 which engages the outer peripheral edge of an idler wheel 33 located below the turntable 13. A small rubber tire or wheel 34 mounted on the idler wheel 33 engages the inner peripheral edge of the turntable 13. The motor 31 is resiliently secured to the bottom of the turntable well 12 by suitable suspension means as indicated at 35. A control button 36 mounted above the motor board 11 and provided with a suitable power switch (not shown) may be manipulated to effect tripping of the mechanism and energization of the motor and rotation of the turntable 13** at a desired speed in a well-known manner.

Figure 4:
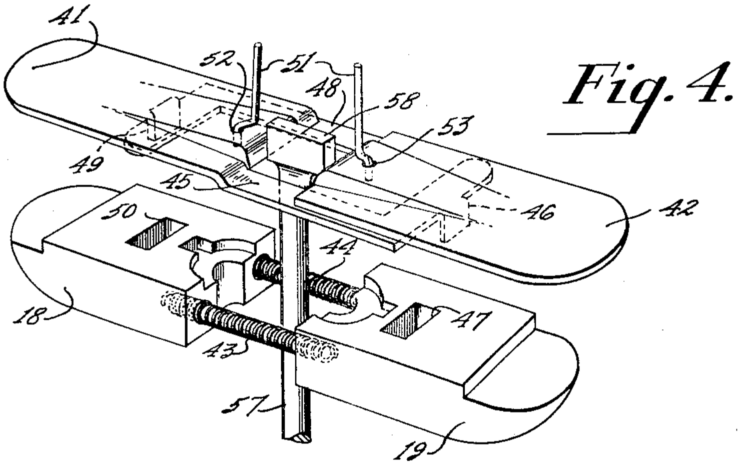
Figure 4 is an exploded view of certain parts of the record changing control system shown in Figures 2 and 3.
Figure 5:
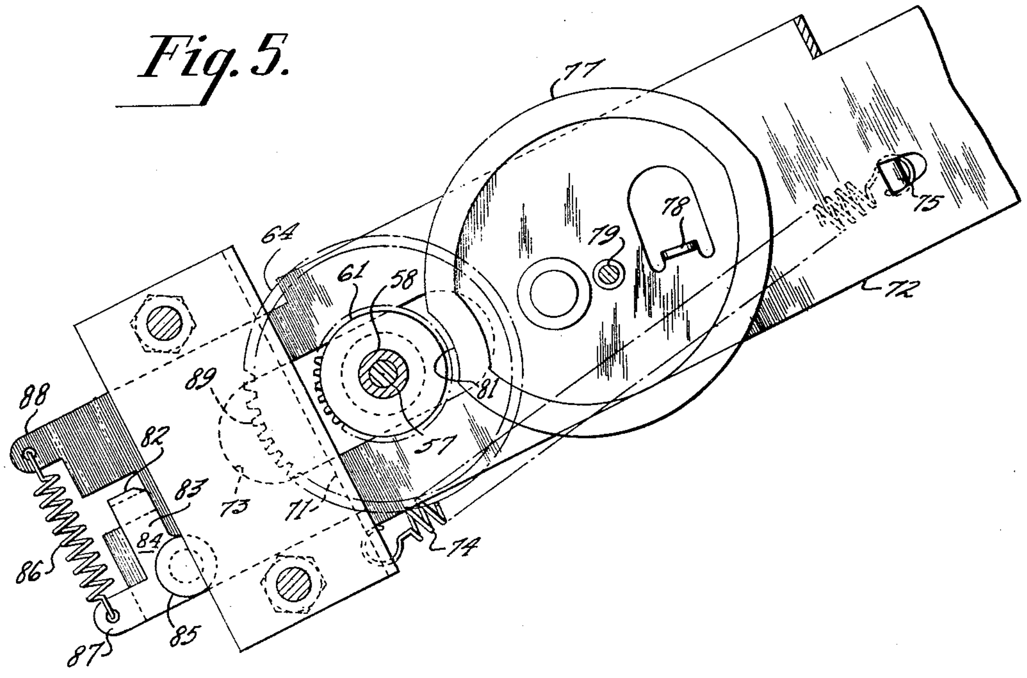
Figure 5 is a sectional plan view taken along the line 5—5 of Figure 2, showing the arrangement of certain parts of the record changing control system during the normal playing of a record.

The center post 14 houses record changing means or record selecting or separating apparatus comprising the pair of record supports or shelves 18, 19 and a pair of thin blades or record separators 41, 42. As can be seen clearly in the exploded view shown in Figure 4, the separators 41, 42 are oppositely disposed and positioned respectively above the shelves 18, 19. The shelves 18, 19 are provided with a pair of parallel thrust springs 43, 44 therebetween which constantly urge the shelves 18, 19 apart. The separator 41 is provided with a finger-like extension 45 which extends between the oppositely disposed separator 42 and the shelf 19 thereunder. A depending member 46 on the end of the finger-like extension 45 extends downwardly to fit into a recess 47 provided in the top of the shelf 19 thereunder. Similarly the oppositely disposed separator 42 is provided with a finger-like extension 48 having a similar depending member 49 thereon which fits into a recess 50 provided in the top of the shelf 18 located thereunder.

Figure 3:
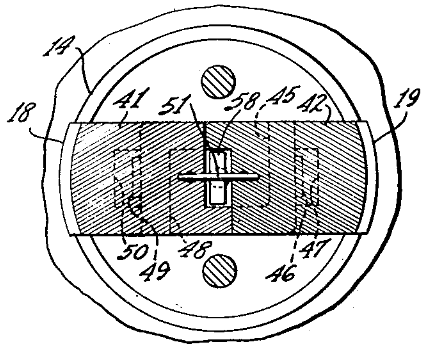
Figure 3 is a fragmentary plan view of a portion of the record changer of Figure 1 showing an arrangement of part of the record changing control system during the normal playing of a record.

A substantially U-shaped wire spring 51 has one end thereof inserted in an aperture 52 located near the inner edge of one separator 41, and the other end of the wire spring 51 similarly fits into an aperture 53 located in the oppositely disposed separator 42. The wire spring 51 acts to urge the separators 41, 42 together. Thus the wire spring 51 and the thrust springs 43, 44 separately function to hold both separators 41, 42 and both shelves 18, 19, whereby during the normal playing of a record or between record changing cycles the shelves 18, 19 project from the body of the center post 14 and the separators 41, 42 are withdrawn inside the center post, as shown in Figures 2 and 3.

Figures 6, 7:
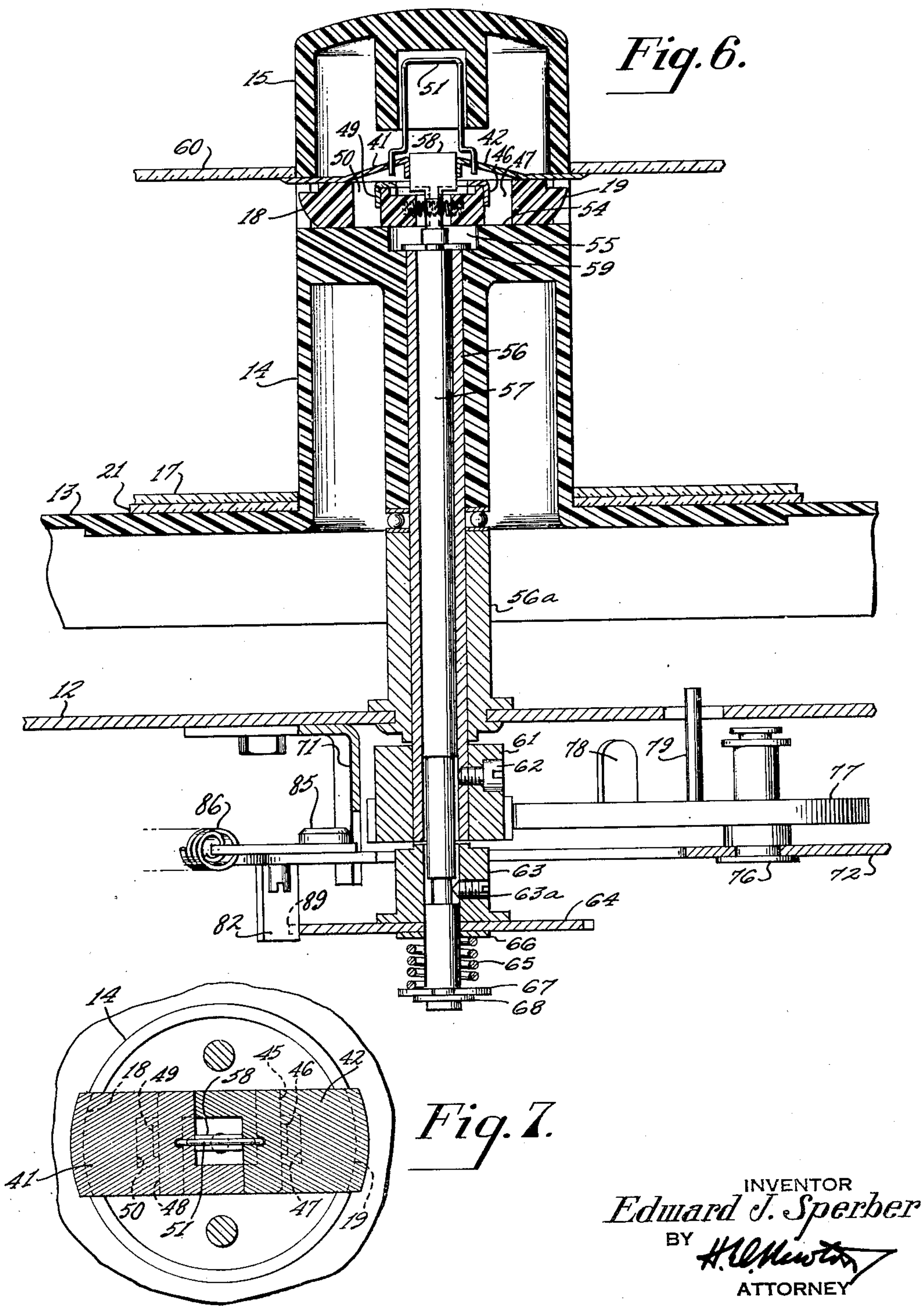
Figure 6 is a side view partly in section, similar to Figure 2, showing the relation between certain component parts of the record changing control system during a record changing operation, further in accordance with the invention.
Figure 7 is a fragmentary plan view similar to Figure 3, showing the arrangement of the parts shown in Figure 3 during a record changing cycle.

As shown in Figures 2 and 6, the shelves 18, 19 ride on or engage a flat surface 54 on the top of the center post 14. The flat surface 54 is provided with a central recess 55. A bushing or sleeve 56 of smaller diameter than the recess 55, centrally located within the center post 14 and adapted to turn therewith, extends upwardly through the center post from below the turntable 13 to the bottom of the recess 55. A central control shaft 57 adapted to rotate within the bushing 56 extends upwardly therethrough between the shelves 18, 19 and a cam member or flattened rectangular portion 58 on the upper end of the shaft is located between the separators 41, 42. A "C"-washer 59 mounted on the shaft 57 rests on the bottom of the recess 55 so that the flattened rectangular portion 58 will be maintained in its position between the separators 41, 42.

Between record changing cycles or during the playing of a record, the shaft 57 is free to rotate with the center post 14. The separators 41, 42, which bear against the flattened portion 58 of the shaft, and which with the shelves 18, 19 turn with the center post 14, effect the rotation of the shaft 57 with the center post 14. The lower end of the bushing 56 is journaled to rotate in a central bearing member **56*a* fixed to the motor board 11 in the turntable 12**.

The flattened rectangular portion 58 is so arranged during the playing of a record that the sides thereof are presented to the oppositely disposed separators 41, 42. If the shaft 57 is held stationary while the center post 14 rotates, the separators 41, 42 move around the flattened rectangular portion 58 to register against the opposite ends thereof, whereupon the separators 41, 42 are forced apart and the shelves 18, 19 are urged toward each other. This position can be seen in Figures 6 and 7.

When the separators 41, 42 move apart, they project from the center post between the lowermost record 17 and the next lowermost record 60 of the stack 16. The shelves 18, 19 upon being urged toward each other withdraw into the center post and permit the lowermost record 17 to drop to the turntable (see Figure 6). The record selecting operation is completed when, upon further rotation of the center post 14, the separators 41, 42 move from the ends of the flattened rectangular portion 58 again to register against the opposite sides thereof, whereupon the shaft 57 can be released to rotate with the center post 14 and permit the shelves and separators to occupy their respective record playing cycle positions.

In accordance with this invention, to provide a record changing control system or mechanism operable with the apparatus above described for stopping and releasing the shaft 57 and effecting the operation of the shelves 18, 19 and separators 41, 42 in the manner above explained, a knurled roller 61 is mounted on the bushing 56 beneath the turntable well 12. A set screw 62 is employed to lock the knurled roller 61 to the bushing 56. A friction bushing or collar 63 mounted on and secured to the shaft 57 as by a set screw **63*a* to abut the lower end of the knurled roller 61, and a serrated clutch disc or fine toothed ratchet wheel 64 mounted on the shaft 57 below the friction collar 63 is held in frictional contact therewith by means of a clutch disc or ratchet wheel thrust spring 65. The ratchet wheel thrust spring 65 is located between the ratchet wheel and the lower end of the shaft 57. The lower end of the shaft is grooved and a pair of washers 66, 67 are provided at opposite ends of the ratchet wheel thrust spring and bear respectively against the bottom of the ratchet wheel 64 and a C washer 68** on the grooved end of the shaft.

Suitably bracketed to the bottom of the turntable well 13 is an inverted U-shaped guide member 71. A record change cycle control element or reciprocating cycling control slide 72 having an opening 73 thereon through which the friction collar 63 projects is mounted as indicated in Figure 1 for horizontal sliding movement between the arms of the guide member 71. A control slide return spring 74 is connected between the guide member 71 and a lug 75 on the cycling slide 72.

Eccentrically mounted on the top of the cycling slide 72 as indicated at 76 is a rubber cam 77. The cam 77 is provided with studs 78 and 79 which are adapted to be engaged by suitable tripping mechanisms, as for instance by a trip lever 80 mounted on the trip lever assembly plate 25 and in the path of which trip lever 80 lies the stud 78, whereby said trip lever 80 can strike the stud 79 and impart slight rotational movement to the cam 77. The cam 77 is provided with a cut-away portion 81 thereon which is concentric with the knurled roller 61 and in which the knurled roller rotates between record-changing cycles. The cam 77 upon engagement of either of the studs 78 and 79 thereon as above mentioned is rotated slightly to permit the knurled portion of the knurled roller 61 to engage the cam 77 on the outer peripheral edge thereof, whereupon further rotation of the knurled roller 61 with the turntable causes the cam 77 to rotate and impart horizontal movement to the control slide 72. The control slide 72 is provided with a stop dog member or detent 82 near one end thereof which projects down past the toothed ratchet wheel 64 and is adapted to engage a serrature or tooth on the ratchet wheel at the appropriate moment to stop the rotation of the shaft 57 and thereby cause the record changing apparatus in the center post 14 to operate as above described.

To prevent damage to the teeth of the ratchet wheel 64 the detent 82 is resiliently mounted on the control slide 72. In a preferred arrangement, the stop dog is a downwardly extending depending member of one leg 83 of an L-shaped member 84 pivotally mounted on top of the control slide 72 as indicated at 85. A spring 86 is connected between the other leg 87 of the L-shaped member 84 and a lug 88 on the control slide 72. This arrangement prevents chipping of the serratures or teeth 89 of the ratchet wheel 64 as the stop dog 82 moves into engagement with the ratchet wheel to stop the wheel and shaft 57.

When the record changing apparatus has operated to permit a record to drop on the turntable 13, as hereinbefore described, the control slide 72, under the combined influences of the cam 77 and the control slide return spring 74, is cammed back to its between-cycles position. When this return movement begins, the detent 82 disengages the toothed ratchet wheel 64 and permits such ratchet wheel and the shaft 57 to resume rotation with the center post 14 and turntable 13. The return movement of the control slide 72 is completed when the cut-away portion 81 of the cam 77 again is concentric with the knurled roller 61.

Should the separators 41, 42 upon the stopping of the shaft 57 in the record changing operation jam and fail to operate in the intended manner, there would be a resultant tendency to stop the turntable, thereby causing a heavy load to be placed upon the turntable driving wheel 34. This would tend to cause the rubber material of the driving wheel 34 to be rubbed off, causing irregularities thereof which would result in subsequent turntable rumble and/or speed variation. Simultaneously with the above, such jamming obviously would tend to place a heavy load upon the cam 77, thus upsetting the cycling process; this could lead to injury of the tone arm 22 and the stylus 23, since the tone arm may be in a position during erratic rotation of the cam to be struck by a record should the separators 41, 42 and shelves 18, 19 suddenly begin to function.

The ratchet wheel 64 and thrust spring 65 provide a slip or safety clutch means with the friction collar 63. The thrust spring 65 forces the abutting clutch faces of the friction collar 63 and the ratchet wheel 64 together to effectuate a frictional drive connection between the shaft 57 and the ratchet wheel 64. The thrust of the thrust spring 65, while sufficient to keep the ratchet wheel substantially locked with the shaft 57 through the frictional drive connection of the ratchet wheel and the friction collar during normal record changing operations, is such that if the rotating separators 41, 42 are jammed, action of the separators upon the cam portion or flattened rectangular portion 58 of the shaft 57 causes the shaft and friction collar 63 to turn and overcome the frictional engagement between the friction collar and ratchet wheel 64, thus permitting the shaft to turn freely with the turntable. The ratchet wheel, still locked by engagement of the detent 82 therewith, slips between the friction collar 63 and the spring loaded washer on the opposite sides thereof.

From the foregoing description, it is clear that there is provided an improved record changing control system or mechanism for automatic record changers of the drop type, wherein during normal record playing operations a cam eccentrically mounted on a record change-cycle control slide is engaged by a rotating knurled roller mounted on a rotating bushing or sleeve constituting a turntable shaft that is associated with similarly rotating record separating or changing apparatus. Within such bushing or sleeve is a central control shaft having at one end a flattened portion, adapted to manipulate the record changing apparatus upon the stopping of said shaft during rotation of the record changing apparatus, and having at the other end a thrust spring loaded serrated or finely toothed clutch disk or ratchet wheel. The cam upon being engaged by the knurled roller effects movement of the control slide for controlling a record change cycle, and a stop dog on the control slide engages a serrature or tooth of the ratchet wheel or disk, thereby stopping the shaft and causing the record changing apparatus to operate as described. Should jamming of the record changing apparatus occur, thrust spring loading is such as to permit the ratchet wheel to slip on the control shaft and allow said shaft to resume rotation, thereby preventing damage to elements of the record playing apparatus.

What is claimed is:

1. In an automatic phonograph record changer of the drop type, the combination with a turntable having a record receiving center post rotatable therewith, record changing apparatus carried in and rotatable with said center post, and a central control shaft having a free end extending below said turntable and a cam portion at the opposite end engaging said record changing apparatus, whereby said record changing apparatus effects rotation of said shaft therewith during a record playing cycle, of a record change cycle control element, slip clutch means including a clutch disk on said free end of said control shaft, slip clutch disk engaging means on said control element, and means including a force loading element effecting a frictional drive connection between said control shaft and said slip clutch disk means to move said disk engaging means into operative engagement with said slip clutch disk during a record change cycle, whereby said shaft is held immobile to effect operation of said record changing apparatus in a predetermined manner, and said record changing apparatus upon malfunctioning being operable through said shaft to overcome the frictional drive connection between said shaft and said slip clutch disk and effect normal rotation of said shaft with said turntable and spindle.

2. In a drop type automatic record changer, the combination with a record change cycle control element having a rotatable cycle initiating cam, a turntable having a record receiving spindle containing record changing apparatus adapted for rotation with said turntable, a record changing control system comprising a control shaft rotatable within a bushing centrally located within said spindle, said shaft having a portion at one end thereof engaged by said record changing apparatus to turn said shaft with said turntable during a record playing cycle, cam engaging means on said bushing operable at the end of a record playing cycle to rotate said cam and impart movement to said control element for controlling a record change cycle, a clutch disk surrounding the end of said shaft opposite said record changing apparatus, spring loading means providing a frictional connection between said shaft and said clutch disk, and clutch disk engaging means on said control element for stopping said shaft, means to move said disk engaging means into operative engagement with said clutch disk during a record change cycle, whereby said shaft upon continued rotation of said record changing apparatus with said spindle effects operation of said record changing apparatus in a predetermined manner, and said record changing apparatus upon malfunctioning thereof being operable through said shaft portion engaged thereby to overcome the frictional drive connection between said shaft and said clutch disk and permit rotation of said shaft with said record changing apparatus and said spindle.

3. In an automatic phonograph record changer of the drop type having a turntable and a central record receiving spindle carried by the turntable, the combination with record changing apparatus housed in said spindle, a central control shaft in said spindle having a free end and a cam member at the opposite end, said cam member engaging said record changing apparatus and operable thereby to rotate said shaft with said spindle and said turntable during a record playing cycle, of a record changing control system comprising a record change cycle control slide having a rotatable cam, means operable to rotate said rotatable cam with said spindle at the completion of a record playing cycle for initiating movement of said record change cycle control slide to control a record changing cycle, a detent carried by and movable with said record change cycle control slide in a predetermined path upon initiating of a record changing cycle, a fine toothed ratchet wheel mounted on the free end of said shaft in said predetermined path, means for engaging said detent in operative relationship with said ratchet wheel during said change cycle to hold said ratchet wheel immobile, and means effecting frictional contact between said shaft and said ratchet wheel, said shaft is stopped by said ratchet wheel when said ratchet wheel is engaged in operative relationship with said detent during said change cycle to effect normal operation of said record changing apparatus in a predetermined manner, and said record changing apparatus upon malfunctioning thereof being operable to overcome said frictional contact between said shaft and said ratchet wheel and release said shaft for rotation with said spindle and turntable.

4. In a drop type automatic record changer, a record changing control system in combination with a turntable, a spindle carried by said turntable for receiving a stack of records to be played, a pair of record supporting shelves and a pair of record separators carried in and rotatable with said spindle, a control shaft extending into said spindle and having a cam portion at one end thereof engaging said record separators, whereby said shaft is rotated with said shelves and separators during a record playing cycle, means to hold said shaft immobile during rotation of said shelves and separators to cam said shelves and separators in a predetermined manner for separating the lowermost record from the remaining records of the stack, whereby said lowermost record is permitted to drop onto said turntable to be played, a record change cycle control slide, a record change cycle initiating cam provided by said control slide, said control slide actuated by said cam to effect a record changing cycle, and cam engaging means surrounding said shaft and rotatable with said turntable means for moving said cam into operative relationship with said engaging means during a record change cycle, said record changing control system comprising a peripherally serrated slip clutch disk on said shaft, a clutch disc engaging detent on said control slide in the path of said slip clutch disk operative to engage a serrature of said slip clutch disk, means for moving said detent into operative relationship with said clutch disc during a record change cycle, and thrust spring means providing frictional engagement between said shaft and said slip clutch disk, whereby said shaft upon engagement of said serrature by said detent is held immobile to effect operation of said shelves and said separators in said predetermined manner, and said shelves and separators upon failure of said separators to function in said predetermined manner being operable on said shaft through said cam portion to overcome the frictional engagement and free said shaft for rotation with said shelves and separators, whereby possible damage to component parts of the record changer is prevented.

5. In an automatic record changer, a record changing control mechanism in combination with a turntable, a spindle carried by said turntable for receiving a stack of records to be played, record selecting apparatus in said spindle, a shaft extending into said spindle and having a cam portion on one end thereof engaging said record selecting apparatus, said shaft rotatable, with said turntable, means for holding said shaft immobile during rotation of said turntable to operate said record changing apparatus in a predetermined manner a record change cycle control slide, a cycle initiating cam carried by said control slide, and cam engaging means surrounding said shaft being rotatable by and with said spindle whereby said control slide is operable to effect record changing operations, a peripherally serrated disk mounted on said shaft adjacent said cam engaging means, a detent carried by said control slide being operable to engage a serrature of said disk, and thrust means on said shaft bearing against said disk effecting frictional engagement between said shaft and said disk, means for engaging said detent in a serrature of said disk during a record change cycle whereby engagement of a serrature of said disk by said detent prevents said shaft from turning and thereby effects operation of said record changing apparatus in said predetermined manner, and said shaft upon failure of said record changing apparatus to function properly being operable by said record changing apparatus to overcome said frictional engagement to permit said disk to slip on said shaft and free said shaft from rotation with said record changing apparatus, whereby damage to component parts of the record changer is prevented.

6. In an automatic drop type record changer, a record changing control system adapted for operation with a turntable, a spindle carried by said turntable and adapted to receive a stack of records to be played, record changing apparatus in said spindle, a shaft extending through said turntable into said spindle and having a cam portion on one end thereof engaging said record changing apparatus, means for effecting relative movement between said shaft and said turntable to operate said record changing apparatus in a predetermined manner a record change control slide, a cycle initiating cam carried on said control slide, a cam engaging knurled roller surrounding said shaft under said turntable and adjacent said cam, said knurled roller being rotatable with said turntable whereby said cam is adapted upon movement thereof to be engaged by said knurled roller to move said control slide and thereby effect a record change cycle, said record changing control system comprising a friction collar fixed on said shaft and abutting said knurled roller, a finely toothed ratchet wheel mounted on said shaft adjacent said friction collar, a stop dog carried on said control slide and operable to engage a tooth on said ratchet wheel, and thrust spring means bearing against said ratchet wheel to effect frictional contact between said ratchet wheel and said friction collar, said frictionally contacting ratchet wheel and friction collar effective upon engagement of a tooth of said ratchet wheel by said stop dog to prevent rotation of said shaft, whereby said shaft upon further rotation of said record changing apparatus effects operation of said record changing apparatus for selecting a record, and said record changing apparatus upon failure of operation thereof being operable on said shaft to overcome said frictional contact, whereby said ratchet wheel slips on said shaft and said shaft is freed to rotate with said record changing apparatus to prevent damage to component parts of the record changer.

7. In an automatic phonograph record changer of the drop type, the combination with a turntable having a record receiving center post rotatable therewith, record changing apparatus carried in and rotatable with said center post, and a central control shaft having a free end extending below said turntable and means at the opposite end engaging said record changing apparatus, of a record change cycle control element, slip clutch means including a clutch disk on said free end of said control shaft, slip clutch disk engaging means on said control element, and means including a force loading element effecting a frictional drive connection between said control shaft and said slip clutch disk, and means to move said disk engaging means into operative engagement with said slip clutch disk during a record change cycle.

References Cited in the file of this patent

UNITED STATES PATENTS

| | | |
|---|---|---|
| 1,568,130 | Blackwell | Jan. 5, 1926 |
| 2,287,098 | Habegger | June 23, 1942 |
| 2,331,383 | Faulkner | Oct. 12, 1943 |
| 2,541,072 | Jones | Feb. 13, 1951 |
| 2,565,413 | Wahtera et al. | Aug. 21, 1951 |
| 2,634,135 | Carson | Apr. 7, 1953 |